US012797776B2

(12) United States Patent
Pfeiffer et al.

(10) Patent No.: US 12,797,776 B2
(45) Date of Patent: Nov. 17, 2026

(54) AIR FILTER ASSEMBLY

(71) Applicant: Wolf Tooth Components, LLC, Burnsville, MN (US)

(72) Inventors: Michael W. Pfeiffer, Burnsville, MN (US); Robert Brown, Burnsville, MN (US)

(73) Assignee: Wolf Tooth Components, LLC, Burnsville, MN (US)

( * ) Notice: Subject to any disclaimer, the term of this patent is extended or adjusted under 35 U.S.C. 154(b) by 290 days.

(21) Appl. No.: 18/893,940

(22) Filed: Sep. 23, 2024

(65) Prior Publication Data

US 2025/0099882 A1 Mar. 27, 2025

Related U.S. Application Data

(60) Provisional application No. 63/539,813, filed on Sep. 21, 2023.

(51) Int. Cl.

| | |
|---|---|
| ***B01D 29/13*** | (2006.01) |
| ***B62J 1/28*** | (2006.01) |
| *B62J 1/08* | (2006.01) |

(52) U.S. Cl.

CPC ................ *B01D 29/13* (2013.01); *B62J 1/28* (2013.01); *B01D 2201/0415* (2013.01); *B01D 2201/302* (2013.01); *B01D 2201/304* (2013.01); *B62J 2001/085* (2013.01)

(58) Field of Classification Search

CPC ............ B01D 29/13; B01D 2201/0415; B01D 2201/302; B01D 2201/304; B01D 46/00; B62J 1/28; B62J 2001/085; B62J 1/08

USPC .... 55/385.1, 385.4, 490, 502, 504, 505, 510

See application file for complete search history.

(56) References Cited

U.S. PATENT DOCUMENTS 3,496,838 A 2/1970 Barrett et al.
4,147,096 A * 4/1979 Caswell .................. F16K 24/04 137/533.27
4,720,085 A 1/1988 Shinbori et al.
5,348,570 A * 9/1994 Ruppert, Jr. .......... F16H 57/027 55/504
5,983,778 A * 11/1999 Dawson .................. F15B 15/16 92/52

(Continued)

FOREIGN PATENT DOCUMENTS

CN 204279728 U * 4/2015
CN 218258476 U * 1/2023

(Continued)

OTHER PUBLICATIONS

Machine-generated English translation of CN-218258476-U, published Jan. 1, 2023.*

(Continued)

*Primary Examiner* — Frank M Lawrence, Jr.

(74) *Attorney, Agent, or Firm* — Dicke, Billig & Czaja, PLLC

(57) ABSTRACT

An air filter assembly for a height adjustment seat post including a lower tube and an upper tube telescopically supported within the lower tube includes a lower cap within an end of the lower tube of the height adjustment seat post, a filter within the end of the lower tube, and a filter retainer to retain the filter within the end of the lower tube, the filter to filter air expelled or ingested through the end of the lower tube through the lower cap.

20 Claims, 11 Drawing Sheets

(56) References Cited

U.S. PATENT DOCUMENTS

| | | | | |
|---|---|---|---|---|
| 6,015,444 | A * | 1/2000 | Craft | F16H 57/027 74/606 R |
| 6,019,676 | A * | 2/2000 | Kim | B60H 3/0608 55/505 |
| 6,450,083 | B1 * | 9/2002 | Dawson | F15B 15/16 92/53 |
| 7,673,936 | B2 | 3/2010 | Hsu | |
| 8,016,349 | B2 | 9/2011 | Mouri et al. | |
| 8,177,251 | B2 | 5/2012 | Shirai | |
| 8,191,964 | B2 | 6/2012 | Hsu | |
| 8,302,983 | B1 | 11/2012 | Hsu | |
| 8,308,124 | B2 | 11/2012 | Hsu | |
| 8,596,663 | B2 | 12/2013 | Shirai | |
| 8,950,771 | B2 | 2/2015 | Felsl et al. | |
| 9,027,434 | B2 | 5/2015 | Neeley | |
| 9,052,119 | B2 * | 6/2015 | Uemura | B01D 63/089 |
| 9,126,647 | B2 | 9/2015 | Kuo | |
| 9,157,523 | B2 | 10/2015 | Miki et al. | |
| 9,242,688 | B2 | 1/2016 | McAndrews et al. | |
| 9,580,124 | B2 | 2/2017 | Shirai | |
| 10,933,935 | B2 | 3/2021 | Jordan | |
| 11,724,760 | B2 | 8/2023 | Jordan | |
| 11,850,612 | B2 * | 12/2023 | Kenny | B05B 11/00442 |
| 2006/0066074 | A1 | 3/2006 | Turner | |
| 2009/0108642 | A1 | 4/2009 | Hsu | |
| 2011/0257848 | A1 | 10/2011 | Shirai | |
| 2012/0104221 | A1 | 5/2012 | Hsu | |
| 2012/0243931 | A1 | 9/2012 | Hsu | |
| 2013/0093231 | A1 | 4/2013 | Hsu | |
| 2013/0221713 | A1 | 8/2013 | Pelot et al. | |
| 2014/0013875 | A1 | 1/2014 | Neeley | |
| 2015/0034779 | A1 | 2/2015 | McAndrews et al. | |
| 2015/0232142 | A1 | 8/2015 | Shirai | |
| 2017/0106928 | A1 | 4/2017 | Madau et al. | |
| 2017/0363120 | A1 | 12/2017 | Stander | |
| 2019/0301497 | A1 | 10/2019 | Jordan | |
| 2021/0179218 | A1 | 6/2021 | Jordan | |
| 2023/0382481 | A1 | 11/2023 | Jordan | |

FOREIGN PATENT DOCUMENTS

| | | |
|---|---|---|
| EP | 1799535 | 4/2013 |
| EP | 3290311 | 3/2018 |
| WO | 2016029301 | 3/2016 |
| WO | 2016113673 | 7/2016 |

OTHER PUBLICATIONS

Machine-generated English translation of CN-204279728-U, published Apr. 22, 2015.*

* cited by examiner

AIR FILTER ASSEMBLY

CROSS-REFERENCE TO RELATED APPLICATIONS

This application claims priority under 35 U.S.C. 119(e) to U.S. Provisional Patent Application Ser. No. 63/539,813 filed on Sep. 21, 2023, and incorporated herein by reference. In this instance, the day that is 12 months after the filing date of the provisional application falls on a Saturday (i.e., Saturday, Sep. 21, 2024). As such, the period of pendency of the provisional application is extended to the next succeeding business day (i.e., Monday, Sep. 23, 2024). See 35 U.S.C. 119(e)(3).

BACKGROUND

The present disclosure relates generally to an air filter assembly and, more specifically, relates to an air filter assembly for a height adjustment seat post for a saddle of a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
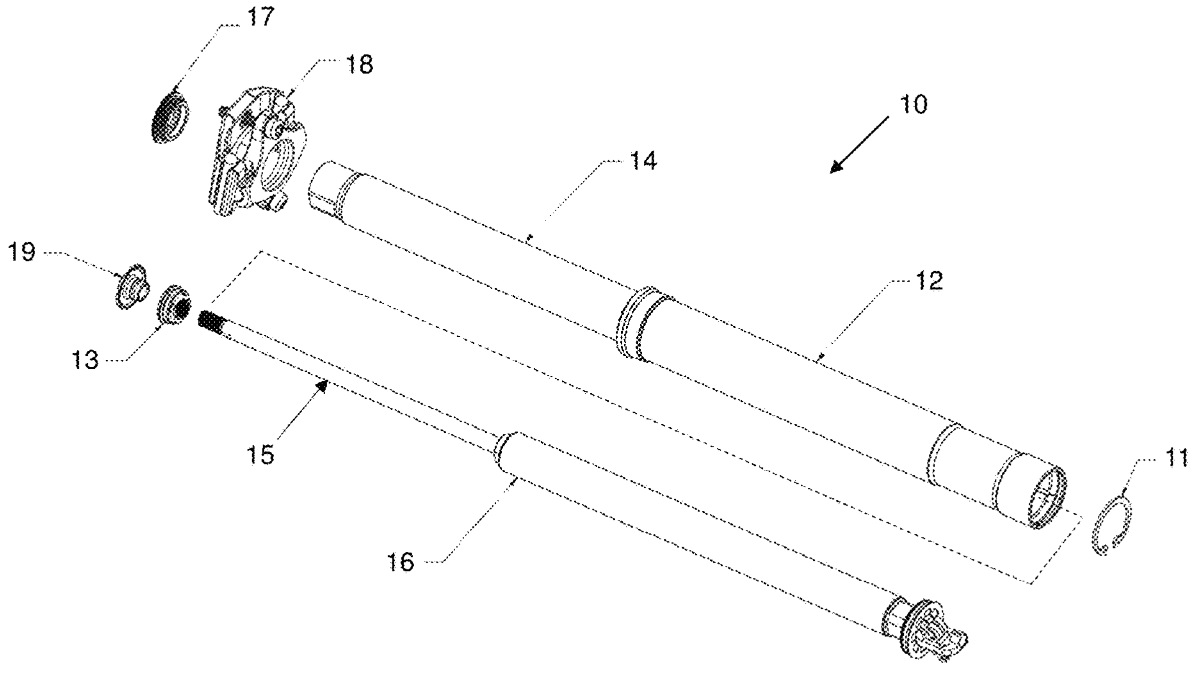
FIGS. 1, 2, 3 illustrate an example of a height adjustment seat post in accordance with the present disclosure.
Figure 2:
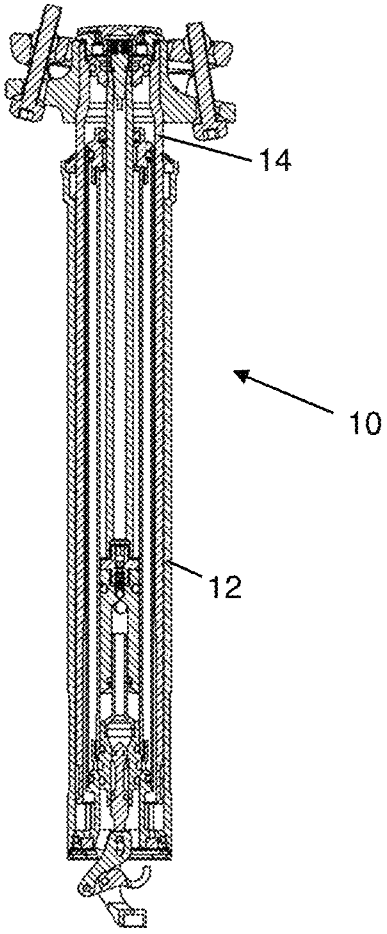
Figure 3:
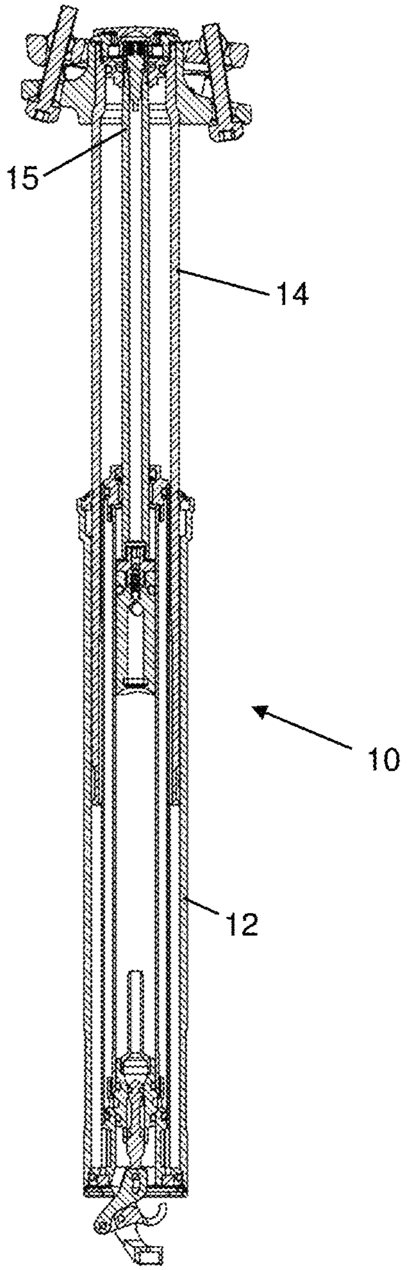
Figure 4:
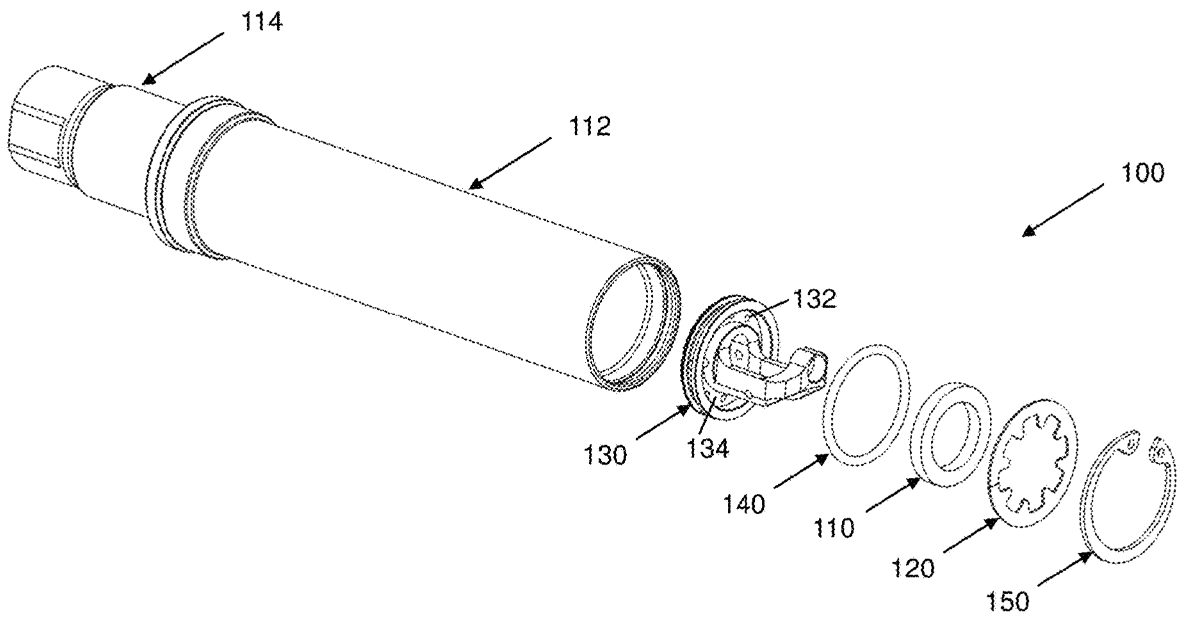
FIGS. 4, 5, 6*a*, 6*b* illustrate an example of an air filter assembly for a height adjustment seat post in accordance with the present disclosure.
Figure 5:
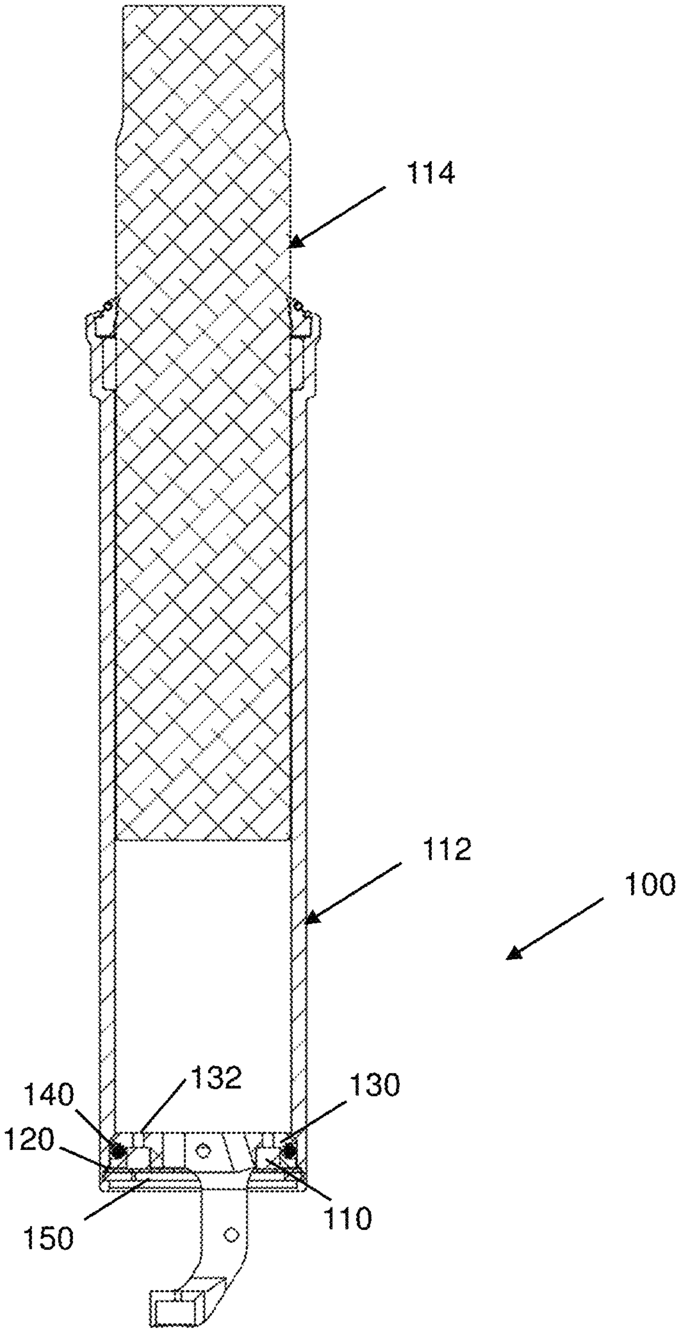

FIGS. 1, 2, 3 illustrate an example of a height adjustment seat post 10 for a saddle of a bicycle, in accordance with the present disclosure. In examples, the height adjustment seat post 10 includes a lower housing (lower tube) 12, a stanchion (upper tube) 14 telescopically supported within the lower housing 12, and a cartridge 16 (including a piston rod 15) supported within the lower housing 12 and the stanchion 14 to telescopically adjust the stanchion 14 relative to the lower housing 12. In examples, a saddle clamp assembly 18 is secured to the stanchion 14, for example, by a lock ring 17, to support a saddle for a bicycle (such as, for example, the saddle 20 for the bicycle 1 of FIG. 11). In examples, an end of the cartridge 16 is retained within the lower housing 12 by a snap ring 11, and an end of the piston rod 15 is secured to an end of the stanchion 14 by an upper cap 13. In examples, an air cap 19 covers the end of the height adjustment seat post 10.

FIGS. 4, 5, 6*a*, 6*b* illustrate an example of an air filter assembly 100 for a height adjustment seat post in accordance with the present disclosure, such as, for example, the height adjustment seat post 10. In examples, the air filter assembly 100 includes a filter 110 positioned within an end of a lower tube 112 of the height adjustment seat post (e.g., the lower housing 12 of the height adjustment seat post 10), and a filter retainer 120 to retain the filter 110 within the end of the lower tube 112 (e.g., the lower housing 12 of the height adjustment seat post 10). In examples, an upper tube 114 of the height adjustment seat post (e.g., the stanchion 14 of the height adjustment seat post 10) extends from an opposite end of the lower tube 112.

In examples, a lower cap 130 is fit within the end of the lower tube 112 with an O-ring seal 140. In examples, the filter 110 is positioned between the lower cap 130 and the filter retainer 120. In examples, an internal retaining ring 150 (e.g., the snap ring 11 of the height adjustment seat post 10) retains the lower cap 130, the filter 110, and the filter retainer 120 within the end of the lower tube 112.

In examples, the filter 110 filters air expelled and/or ingested through the end of the lower tube 112 of the height adjustment seat post (e.g., the lower housing 12 of the height adjustment seat post 10) through the lower cap 130. In examples, the filter 110 filters air expelled and/or ingested through an opening or openings 132 in the lower cap 130. In examples, the openings 132 in the lower cap 130 communicate with an interior of the lower tube 112. In examples, the filter 110 has an annular shape, and the opening or openings 132 in the lower cap 130 are in a circular pattern coinciding with the annular shape of the filter 110. In examples, the lower cap 130 has an annular recess 134, the filter 110 is positioned within the annular recess 134, and the opening or openings 132 in the lower cap 130 are in the annular recess 134. In examples, the filter retainer 120 has an annular shape with a central opening and internal teeth.

In examples, the filter 110 is formed of a reticulated foam, sintered plastic, non-woven fabric or metal. In examples, the filter 110 comprises a foam air filter.

Figure 6A:
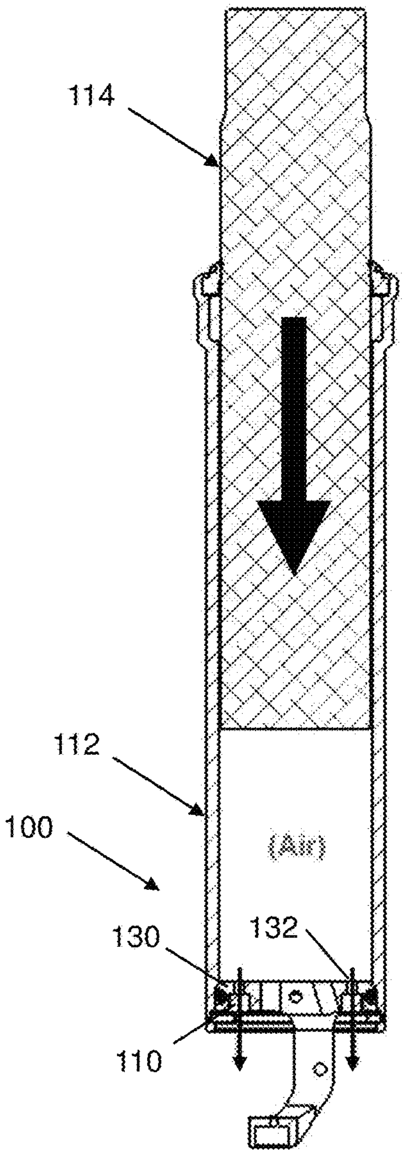
Figure 6B:
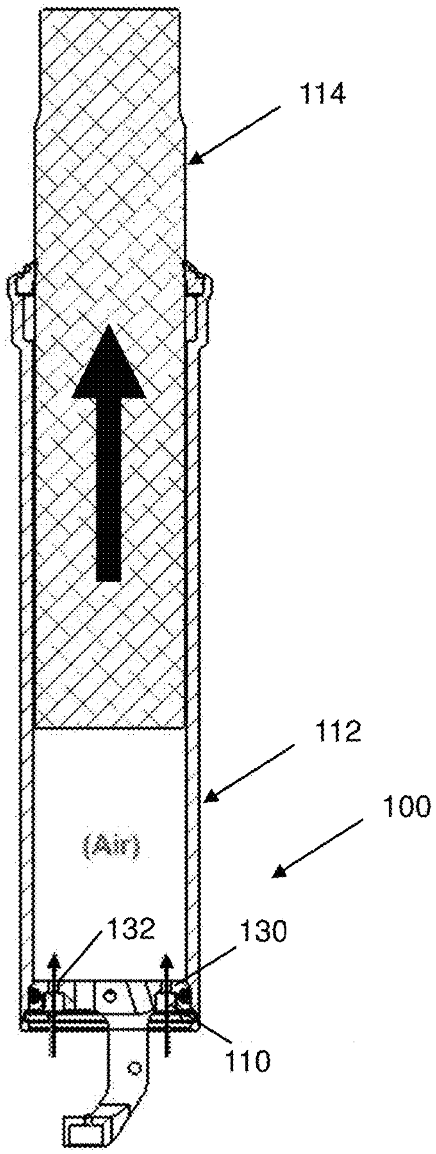

In examples, as illustrated in the example of FIG. 6*a*, air is expelled from within the lower tube 112 and/or the upper tube 114 through the opening or openings 132 in the lower cap 130 and then through the filter 110 to outside the height adjustment seat post, such as, for example, the height adjustment seat post 10. In examples, as illustrated in the example of FIG. 6*b*, air from outside the height adjustment seat post, such as, for example, the height adjustment seat post 10, is ingested through the filter 110 and then through the opening or openings 132 in the lower cap 130 into the lower tube 112 and/or the upper tube 114.

Figure 7:
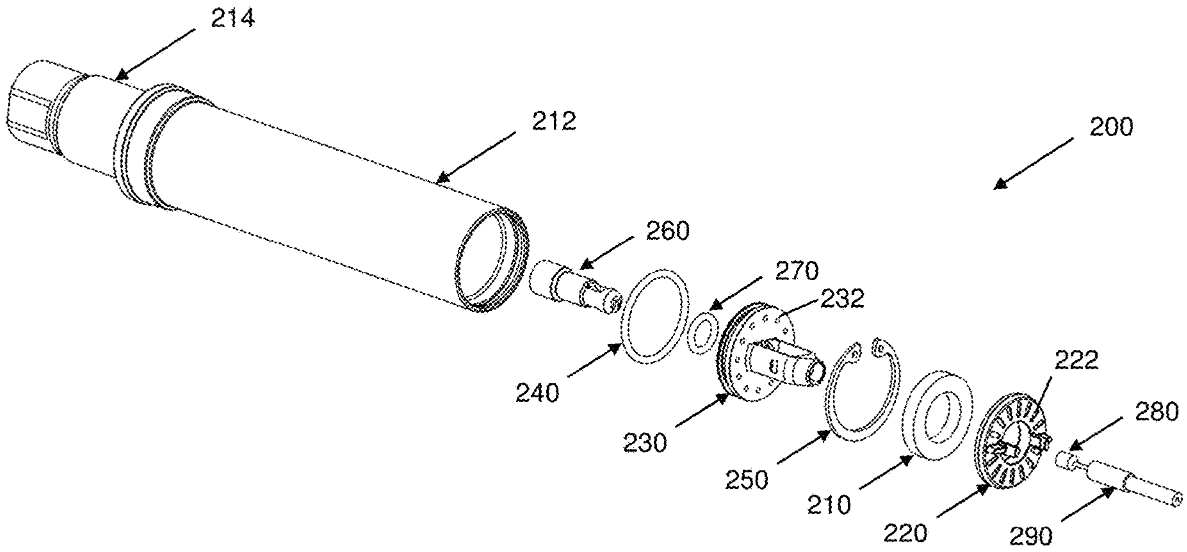
FIGS. 7, 8 illustrate another example of an air filter assembly for a height adjustment seat post in accordance with the present disclosure.
Figure 8:
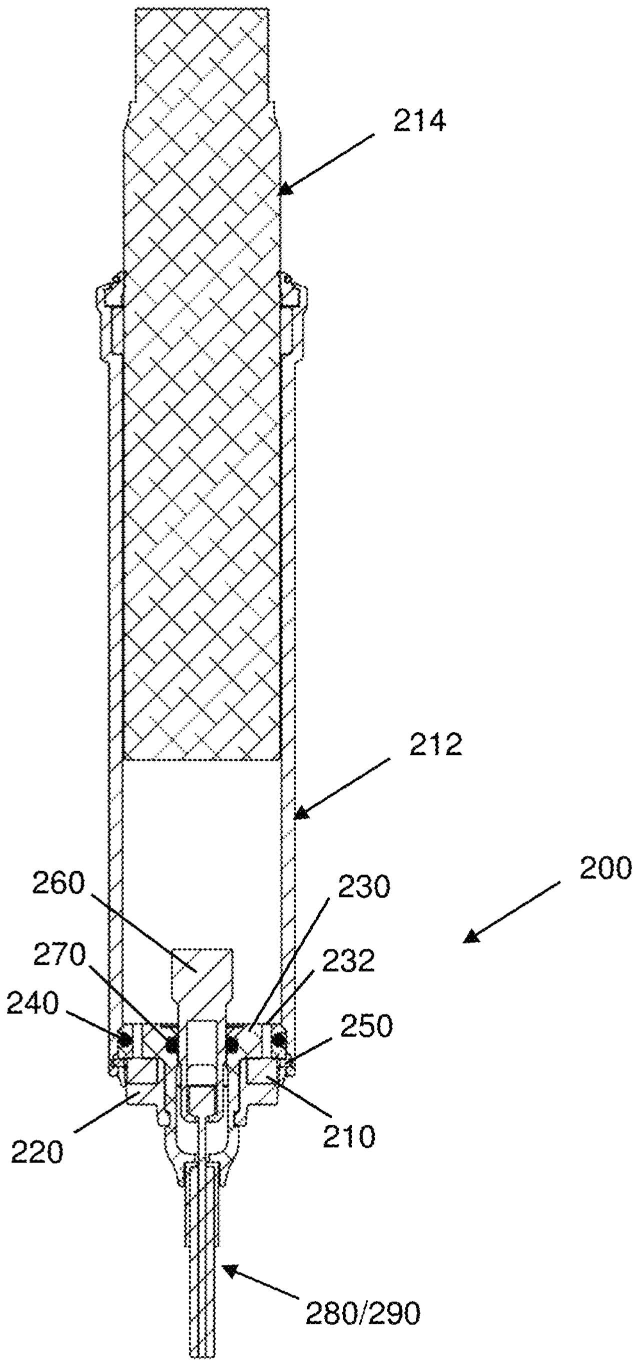

FIGS. 7, 8 illustrate another example of an air filter assembly 200 for a height adjustment seat post in accordance with the present disclosure, such as, for example, the height adjustment seat post 10. In examples, the air filter assembly 200 includes a filter 210 positioned within an end of a lower tube 212 of the height adjustment seat post (e.g., the lower housing 12 of the height adjustment seat post 10), and a filter retainer 220 to retain the filter 210 within the end of the lower tube 212 (e.g., the lower housing 12 of the height adjustment seat post 10). In examples, an upper tube 214 of the height adjustment seat post (e.g., the stanchion 14 of the height adjustment seat post 10) extends from an opposite end of the lower tube 212.

In examples, a lower cap 230 is fit within an end of the lower tube 212 with an O-ring seal 240, and a spool valve sleeve 260 is fit within the lower cap 230 with an O-ring seal 270. In examples, the filter 210 is positioned between the lower cap 230 and the filter retainer 220. In examples, an internal retaining ring 250 retains the lower cap 230 and the spool valve sleeve 260 within the end of the lower tube 212. In examples, a cable 280 (supported within a housing 290) is coupled to the spool valve sleeve 260.

In examples, the filter 210 filters air expelled and/or ingested through the end of the lower tube 212 of the height adjustment seat post (e.g., the lower housing 12 of the height adjustment seat post 10) through the lower cap 230. In examples, the filter 210 filters air expelled and/or ingested through an opening or openings 232 in the lower cap 230 and an opening or openings 222 in the filter retainer 220. In examples, the openings 232 in the lower cap 230 communicate with an interior of the lower tube 212. In examples, the filter 210 has an annular shape, and the opening or openings 232 in the lower cap 230 are in a circular pattern coinciding with the annular shape of the filter 210. In examples, the filter retainer 220 has an annular shape, and the opening or openings 222 in the filter retainer 220 are in a circular pattern coinciding with the annular shape of the filter 210.

In examples, the filter 210 is formed of a reticulated foam, sintered plastic, non-woven fabric or metal. In examples, the filter 210 comprises a foam filter (foam air filter).

In examples, and similar to that illustrated in the example of FIG. **6*a*, air is expelled from within the lower tube 212 and/or the upper tube 214 through the opening or openings 232 in the lower cap 230, then through the filter 210, and then through the opening or openings 222 in the filter retainer 220 to outside the height adjustment seat post, such as, for example, the height adjustment seat post 10. In examples, and similar to that illustrated in the example of FIG. 6*b*, air from outside the height adjustment seat post, such as, for example, the height adjustment seat post 10, is ingested through the opening or openings 222 in the filter retainer 220, then through the filter 210, and then through the opening or openings 232 in the lower cap 230 into the lower tube 212 and/or the upper tube 214**.

Figure 9:
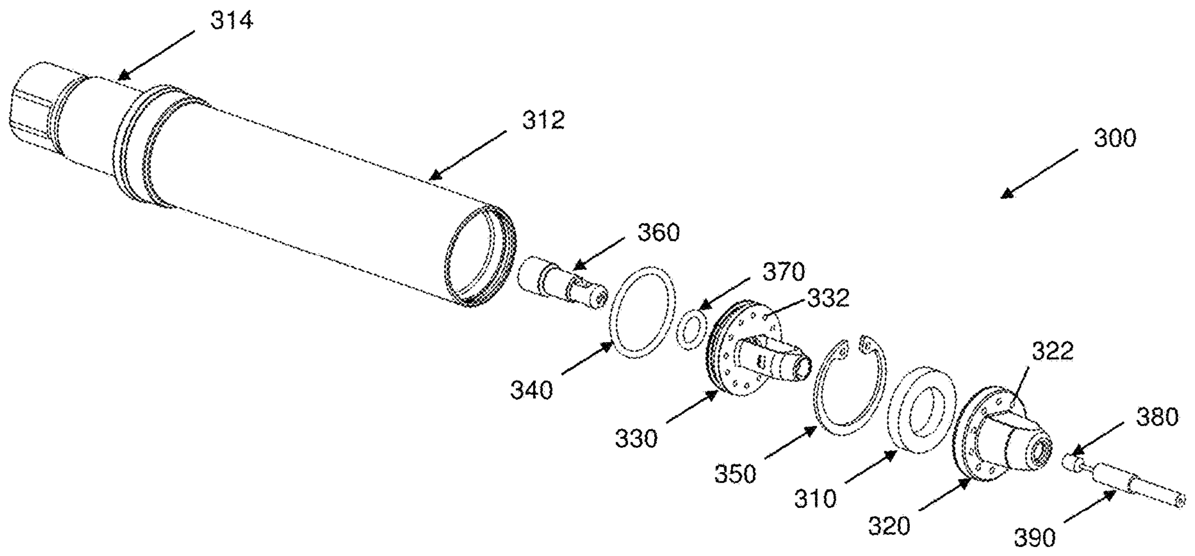
FIGS. 9, 10 illustrate another example of an air filter assembly for a height adjustment seat post in accordance with the present disclosure.
Figure 10:
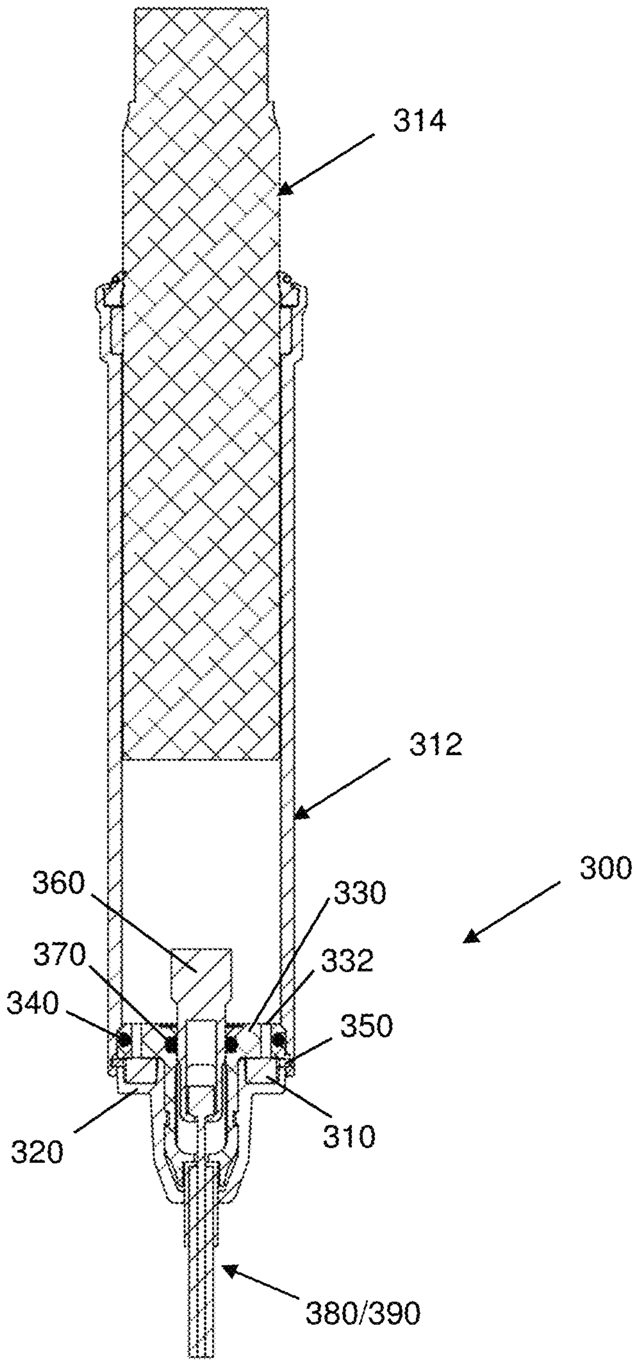

FIGS. 9, 10 illustrate another example of an air filter assembly 300 for a height adjustment seat post in accordance with the present disclosure, such as, for example, the height adjustment seat post 10. In examples, the air filter assembly 300 includes a filter 310 positioned within an end of a lower tube 312 of the height adjustment seat post (e.g., the lower housing 12 of the height adjustment seat post 10), and a filter retainer/boot 320 to retain the filter 310 within the end of the lower tube 312 (e.g., the lower housing 12 of the height adjustment seat post 10). In examples, an upper tube 314 of the height adjustment seat post (e.g., the stanchion 14 of the height adjustment seat post 10) extends from an opposite end of the lower tube 312.

In examples, a lower cap 330 is fit within an end of the lower tube 312 with an O-ring seal 340, and a spool valve sleeve 360 is fit within the lower cap 330 with an O-ring seal 370. In examples, the filter 310 is positioned between the lower cap 330 and the filter retainer 320. In examples, an internal retaining ring 350 retains the lower cap 330 and the spool valve sleeve 360 within the end of the lower tube 312. In examples, a cable 380 (supported within a housing 390) is coupled to the spool valve sleeve 360.

In examples, the filter 310 filters air expelled and/or ingested through the end of the lower tube 312 of the height adjustment seat post (e.g., the lower housing 12 of the height adjustment seat post 10) through the lower cap 330. In examples, the filter 310 filters air expelled and/or ingested through an opening or openings 332 in the lower cap 330 and an opening or openings 322 in the filter retainer/boot 320. In examples, the openings 332 in the lower cap 330 communicate with an interior of the lower tube 312. In examples, the filter 310 has an annular shape, and the opening or openings 332 in the lower cap 330 are in a circular pattern coinciding with the annular shape of the filter 310. In examples, the opening or openings 322 in the filter retainer/boot 320 are in a circular pattern coinciding with the annular shape of the filter 310.

In examples, the filter 310 is formed of a reticulated foam, sintered plastic, non-woven fabric or metal. In examples, the filter 310 comprises a foam filter (foam air filter).

In examples, and similar to that illustrated in the example of FIG. **6*a*, air is expelled from within the lower tube 312 and/or the upper tube 314 through the opening or openings 332 in the lower cap 330, then through the filter 310, and then through the opening or openings 322 in the filter retainer/boot 320 to outside the height adjustment seat post, such as, for example, the height adjustment seat post 10. In examples, and similar to that illustrated in the example of FIG. 6*b*, air from outside the height adjustment seat post, such as, for example, the height adjustment seat post 10, is ingested through the opening or openings 322 in the filter retainer/boot 320, then through the filter 310, and then through the opening or openings 332 in the lower cap 330 into the lower tube 312 and/or the upper tube 314**.

Figure 11:
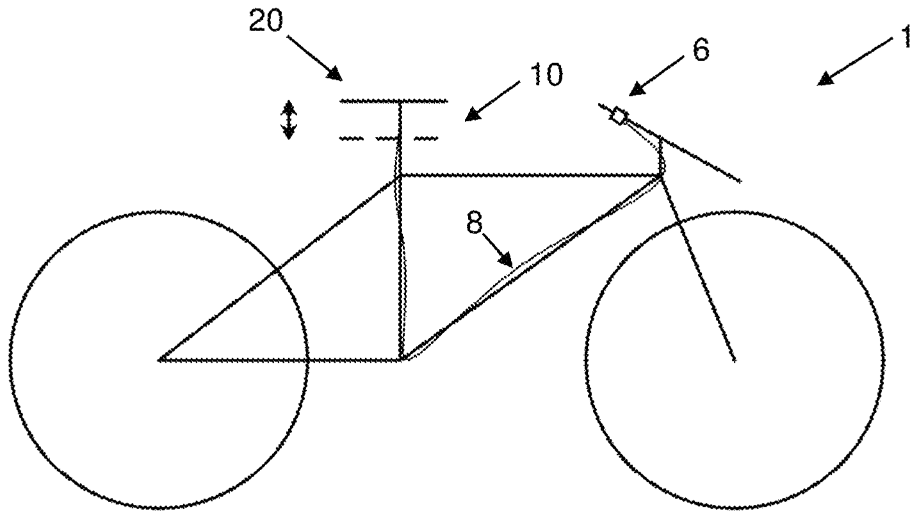
FIG. 11 illustrates an example implementation of an air filter assembly for a height adjustment seat post for a saddle of a bicycle in accordance with the present disclosure.

FIG. 11 illustrates an example implementation of an air filter assembly for a height adjustment seat post for a saddle of a bicycle 1 in accordance with the present disclosure, such as, for example, the height adjustment seat post 10 for the saddle 20. In examples, a control device 6 may be mounted on a bicycle (e.g., a handlebar of a bicycle), such that operation or actuation of the control device 6 may be used to apply pull to an actuation or control cable 8 coupled with a height adjustment seat post for a saddle of a bicycle, such as, for example, the height adjustment seat post 10 for the saddle 20. In examples, the height adjustment seat post includes an air filter assembly in accordance with the present disclosure, such as, for example, the air filter assembly 100, the air filter assembly 200, the air filter assembly 300.

An air filter assembly as disclosed herein, such as, for example, the air filter assembly 100, the air filter assembly 200, the air filter assembly 300, filters air expelled and/or ingested for a height adjustment seat post for a saddle of a bicycle, such as, for example, the height adjustment seat post 10.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An air filter assembly for a height adjustment seat post including a lower tube and an upper tube telescopically supported within the lower tube, the air filter assembly comprising:

a lower cap within an end of the lower tube of the height adjustment seat post;

a filter within the end of the lower tube; and a filter retainer to retain the filter within the end of the lower tube, the filter to filter air expelled or ingested through the end of the lower tube through the lower cap.

2. The air filter assembly of claim 1, wherein:

the filter positioned between the lower cap and the filter retainer.

3. The air filter assembly of claim 1, wherein:

the filter having an annular shape.

4. The air filter assembly of claim 3, wherein:

the lower cap having a plurality of openings therethrough, the openings in the lower cap being in a circular pattern coinciding with the annular shape of the filter.

5. The air filter assembly of claim 4, wherein:

the openings in the lower cap to communicate with an interior of the lower tube.

6. The air filter assembly of claim 3, wherein:

the filter retainer having a plurality of openings therethrough, the openings in the filter retainer being in a circular pattern coinciding with the annular shape of the filter.

7. The air filter assembly of claim 1, further comprising:

an internal retaining ring to retain the lower cap within the end of the lower tube.

8. The air filter assembly of claim 1, further comprising:

an O-ring to seal the lower cap within the end of the lower tube.

9. The air filter assembly of claim 1, wherein:

the filter retainer having at least one opening therethrough.

10. The air filter assembly of claim 1, wherein:

the filter retainer having an annular shape.

11. The air filter assembly of claim 1, wherein:

the filter comprises a foam air filter.

12. An air filter assembly for a height adjustment seat post for a saddle of a bicycle, the air filter assembly comprising:

a lower cap within an end of the height adjustment seat post;

a filter within the end of the height adjustment seat post; and a filter retainer within the end of the height adjustment seat post, the filter positioned between the lower cap and the filter retainer, the filter to filter air expelled or ingested through the end of the height adjustment seat post through the lower cap.

13. The air filter assembly of claim 12, wherein:

the filter having an annular shape.

14. The air filter assembly of claim 13, wherein:

the lower cap having a plurality of openings therethrough, the openings in the lower cap being in a circular pattern coinciding with the annular shape of the filter.

15. The air filter assembly of claim 13, wherein:

the filter retainer having a plurality of openings therethrough, the openings in the filter retainer being in a circular pattern coinciding with the annular shape of the filter.

16. The air filter assembly of claim 12, further comprising:

an internal retaining ring to retain the lower cap within the end of the height adjustment seat post.

17. The air filter assembly of claim 12, further comprising:

an O-ring to seal the lower cap within the end of the height adjustment seat post.

18. The air filter assembly of claim 12, wherein:

the filter retainer having at least one opening therethrough.

19. The air filter assembly of claim 12, wherein:

the filter retainer having an annular shape.

20. The air filter assembly of claim 12, wherein:

the filter is formed of a reticulated foam, sintered plastic, non-woven fabric or metal.

* * * * *